(12) United States Patent
Zamer

(10) Patent No.: US 10,121,174 B2
(45) Date of Patent: Nov. 6, 2018

(54) AD HOC MERCHANT CONFIGURATION SYSTEM

(71) Applicant: EBAY INC., San Jose, CA (US)

(72) Inventor: Kamal Zamer, Austin, TX (US)

(73) Assignee: eBay Inc., San Jose, CA (US)

( * ) Notice: Subject to any disclaimer, the term of this patent is extended or adjusted under 35 U.S.C. 154(b) by 659 days.

(21) Appl. No.: 14/265,094

(22) Filed: Apr. 29, 2014

(65) Prior Publication Data

US 2015/0310515 A1    Oct. 29, 2015

(51) Int. Cl.
G06Q 30/06    (2012.01)

(52) U.S. Cl.
CPC ................ *G06Q 30/0605* (2013.01)

(58) Field of Classification Search
CPC ............ G06Q 30/0601–30/0645; G06Q 30/08
USPC .............................................. 705/26.1–27.2
See application file for complete search history.

(56) References Cited

U.S. PATENT DOCUMENTS

| | | | |
|---|---|---|---|
| 7,725,421 B1 | 5/2010 | Gedalius et al. | |
| 2008/0089288 A1* | 4/2008 | Anschutz | G06Q 30/02 370/331 |
| 2008/0154706 A1 | 6/2008 | Bruecken | |
| 2008/0162297 A1* | 7/2008 | Hershkovitz | G06Q 30/06 705/26.81 |
| 2008/0177662 A1* | 7/2008 | Smith | G06Q 20/24 705/44 |
| 2011/0270909 A1 | 11/2011 | Fu | |
| 2012/0158545 A1* | 6/2012 | Chen | G06Q 30/0623 705/26.61 |
| 2012/0215584 A1 | 8/2012 | Narsude et al. | |
| 2013/0097054 A1* | 4/2013 | Breitenbach | G06Q 30/06 705/26.8 |
| 2013/0103578 A1* | 4/2013 | Mallean | G06Q 30/02 705/39 |
| 2013/0198046 A1 | 8/2013 | Hammad et al. | |

OTHER PUBLICATIONS

Serenko, Alexander, Umar Ruhi, and Mihail Cocosila. "Unplanned Effects of Intelligent Agents on Internet use: A Social Informatics Approach." AI & Society, vol. 21, No. 1-2, 2007, pp. 141-166.*
PCT International Search Report and Written Opinion in PCT/US2015/021570, dated Jul. 8, 2015, 9 pages.
PCT International Preliminary Report on Patentability in PCT/US2015/021570, dated Nov. 1, 2016, 8 pages.

* cited by examiner

*Primary Examiner* — Alexis M Casey
(74) *Attorney, Agent, or Firm* — M&G eBay

(57) ABSTRACT

Systems and methods for providing a merchant virtual storefront to a customer device include a system provider device that receives, through communication over a network with a merchant device that is located at a merchant physical location, a request to establish a merchant virtual storefront from the merchant device. The system provider device also determines the merchant physical location associated with the merchant device. The system provider device analyzes the request to establish the merchant virtual storefront including determining a merchant offering. The system provider device thus generates the merchant virtual storefront that includes the merchant offering and the merchant physical location. In addition, the system provider device provides the merchant virtual storefront to a customer device.

20 Claims, 15 Drawing Sheets

800

AD HOC MERCHANT CONFIGURATION SYSTEM

BACKGROUND

Field of the Invention

The present disclosure generally relates to ad hoc merchants and ad hoc merchant physical locations, and more particularly to an ad hoc merchant configuration system that provides a customer accessible virtual storefront for an ad hoc merchant.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with merchant physical locations and their customers in order to allow the customers to make purchases from the merchants at the merchant physical locations. However, ad hoc merchants that operate without a traditional brick-and-mortar type of physical location may lack many of the benefits associated with such traditional types of merchants. For example, ad hoc merchants may lack the technological infrastructure to utilize online and mobile payment services, advertise their business online, or provide secure electronic transactions for their customers. Currently, such merchants may rely on roadside stands with printed signs or magnetic signs affixed to their vehicles, may be limited to accepting cash payments for products and/or services, may find it difficult to attract new customers if they move to a new location, and may have to rely primarily on word-of-mouth to attract new customers. Moreover, ad hoc merchants may lack the trustworthiness and/or name recognition that comes, in part, with having a traditional brick-and-mortar business and/or through readily accessible online customer feedback and reviews.

Thus, there is a need for an ad hoc merchant configuration system that provides ad hoc merchants, and their customers, a secure and convenient way to conduct their business.

BRIEF DESCRIPTION OF THE FIGURES

FIG. 7 is a front view illustrating an embodiment of a merchant device displaying a customer check-in;

Figure 1:
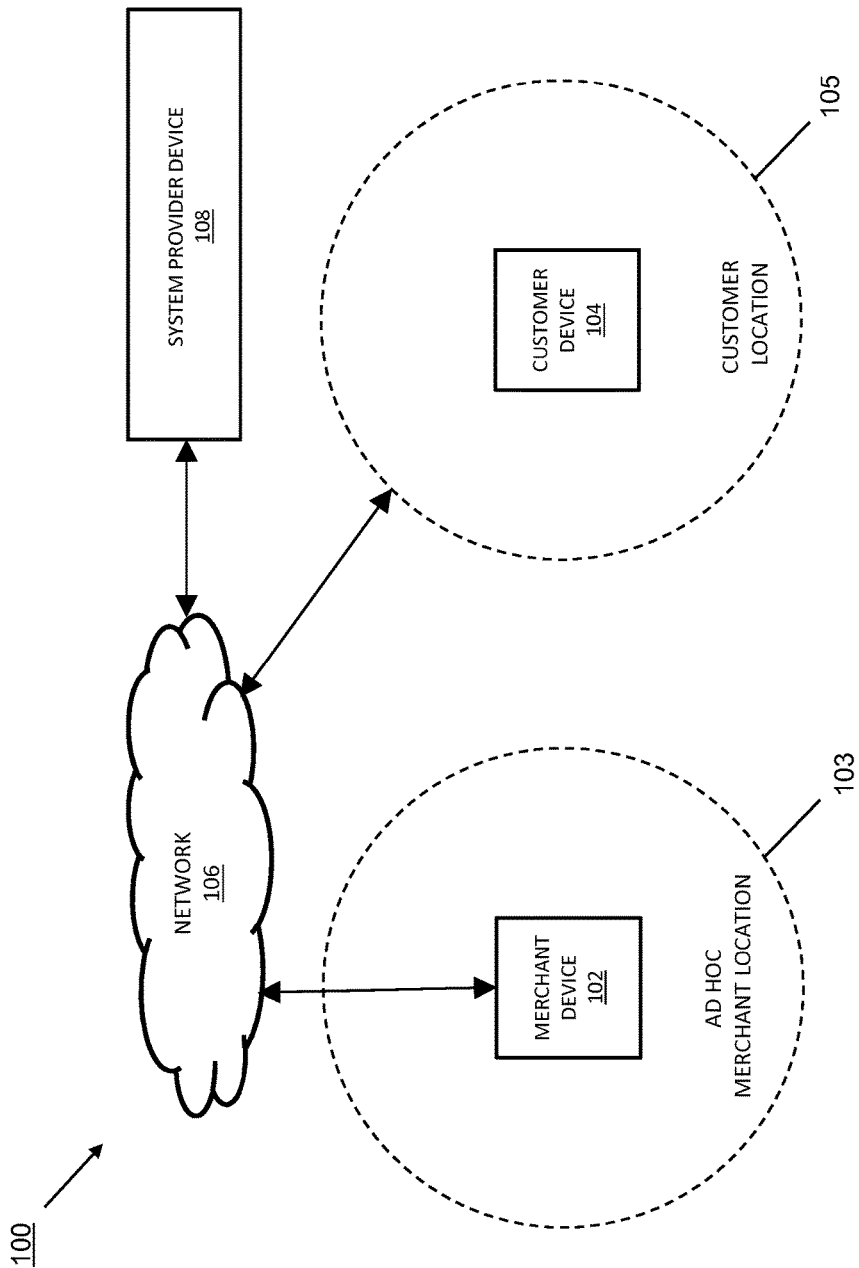
FIG. 1 is a schematic view illustrating an embodiment of an ad hoc merchant configuration system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing a customer accessible virtual storefront for an ad hoc merchant. As used herein, the term "virtual storefront" generally refers to an electronic representation of a business (e.g., accessible via a computer and/or mobile electronic device). By way of example, a virtual storefront as described herein may include a merchant listing within a searchable electronic directory of merchants. Additionally, in other examples, a virtual storefront may include a merchant-specific electronic page (e.g., web page and/or other electronic page accessible through an application executing on a computing device). As discussed below, such a merchant-specific electronic page may include any of a plurality of merchant information such as a merchant name, a map showing a merchant location, a listing of merchant offerings (i.e., goods and/or services), a price list, hours of operation, a merchant rating and/or score, and/or other merchant information known in the art. In some examples, as described in the present disclosure, a virtual storefront may be accessible to a customer via a website (e.g., accessible through an Internet connection using a mobile device and/or a personal computer). In other examples, as discussed above, the virtual storefront of the present disclosure may be accessible to a customer by way of a mobile application executing on the customer's mobile device.

Further, as used herein, the term "ad hoc merchant" generally refers to a merchant without a traditional brick-and-mortar location. In some examples, an ad hoc merchant may include a handyman such as a carpenter, electrician, tile installer, plumber, framer, roofer, painter, landscaper, and/or other type of skilled tradesman operating from their own vehicle such as a work truck, van, and/or other type of vehicle. In other examples, an ad hoc merchant may include a vendor selling food, crafts, furniture, jewelry, and/or other goods on their person, in their possession, or from a vehicle, a pushcart, a trailer, and/or other type of mobile storefront. Conventionally, such ad hoc merchants typically lack the technological infrastructure to utilize online and mobile payment services, advertise their business online, or provide secure electronic transactions for their customers. As such, conventional ad hoc merchants typically rely on makeshift signs and may only accept cash payments for their products and/or services. Additionally, it may be difficult for such conventional merchants to advertise their business, particularly when at a new location, and those merchants may lack the trustworthiness that comes, in part, with having a traditional brick-and-mortar business and/or through readily accessible online customer feedback and reviews.

In accordance with the various embodiments described herein, an ad hoc merchant may be able to take advantage of a secure, sophisticated advertising and payment infrastructure provided by a trusted service provider, as well as gain customer trust and name recognition. While a few examples of an ad hoc merchant have been described, one of skill in the art in possession of the present disclosure will recognize that a wide variety of ad hoc merchants, providing many different types of goods and/or services, will benefit from the a systems and methods discussed below, and thus will fall within the scope of the present disclosure. In various examples, an ad hoc merchant may submit a request (e.g., to a system provider over a network) via a merchant device to establish a merchant virtual storefront. The system provider may determine the ad hoc merchant physical location and analyze the request to establish the merchant virtual storefront. As part of the analyzing the request, the system provide may determine one or more merchant offerings and generate the merchant virtual storefront that includes the one or more merchant offerings. Thereafter, the merchant virtual storefront that includes the merchant physical location and merchant offering may be provided to a customer device. As described in more detail below, the system provider may also manage one or more transactions between the merchant device and a customer device and may periodically confirm and/or update a merchant physical location.

Referring now to FIG. 1, an embodiment of an ad hoc merchant configuration system 100 is illustrated. The ad hoc merchant configuration system 100 includes a merchant device 102, a customer device 104, a network 106, and a system provider device 108. The merchant device 102, the customer device 104, and the system provider device 108 are configured to communicate with one another by way of the network 106. The network 106 may be implemented as a single network or a combination of multiple networks. For example, in various embodiments, the network 106 may include the Internet and/or one or more intranets, landline networks, wireless networks, cellular networks, satellite networks, and/or other appropriate types of networks. In some examples, the merchant device 102 and/or the customer device 104 may communicate through the network 106 via cellular communication. In other examples, the merchant device 102 and/or the customer device 104 may communicate through the network 106 via wireless communication (e.g., via a WiFi network). In yet other examples, the merchant device 102 and/or the customer device 104 may communicate through the network 106 via any of a plurality of other radio and/or telecommunications protocols. In particular, some embodiments described herein include communication from the merchant device 102 and/ or the customer device 104, through the network 106, to the system provider device 108 using a Short Message Service (SMS)-based text message.

The system provider device 108 may likewise couple to the network 106 via a wired or wireless connection. As described in more detail below with reference to FIG. 15, the system provider device 108 may include an ad hoc merchant engine, a communication engine, a merchant information database, and a customer database. Software or instructions stored on the computer-readable medium, and executed by one or more processors of the system provider device 108, allows the system provider device 108 to send and receive information over the network 106. Furthermore, the system provider device 108, for example by way of the ad hoc merchant engine, is configured to implement various embodiments as described herein. In some examples, the system provider device 108 is configured to generate a merchant virtual storefront, as described below, for a merchant associated with the merchant device 102 and located at an ad hoc merchant location 103. Moreover, in various examples, the system provider device 108 is configured to provide the merchant virtual storefront, as described below, to a customer associated with the customer device 104 and located at a customer location 105.

In some examples, regions defined by each of the ad hoc merchant location 103 and the customer location 105 may vary in size according to methods used to determine the ad hoc merchant location 103 and/or the customer location 105. As is known in the art, the precision to which the location of a mobile device (e.g., the merchant device 102 and/or the customer device 104) can be determined may be defined at least partly by the method used for location determination. For example, a global positioning system (GPS) location determination technique may provide an approximately 5-50 foot radius area within which a mobile device is located. In other examples, location determination by triangulation (e.g., via cellular towers) may provide an approximately 50-200 foot radius area within which a mobile device is located. Other location determination methods such as cell sector based methods, WiFi based methods, subscriber identification module (SIM) based methods, and/or a variety of other methods known in the art may also be used and may each have differing levels of precision. In other embodiments, it is envisioned that a merchant, associated with the merchant device 102, and/or a customer associated with the customer device 104 may alternatively manually input their location. For example, a merchant may want to setup an ad hoc business at a particular street corner (e.g., Fourth St. and Main St.), or at a particular address (123 Main St.), and thus the merchant may optionally communicate such information (i.e., street corner or address) to the system provider device 106 (e.g., by way of a text message and/or email) by way of the network 102.

In the embodiments discussed below, the an ad hoc merchant configuration system and methods involve a system provider using a system provider device (e.g., the system provider device 108) to establish a virtual storefront for an ad hoc merchant by communicating, through the network 106, with the merchant device 102. As discussed in more detail below, a merchant associated with the merchant device 102 may submit a request (e.g., via the merchant device 102) to the system provider device 108 to establish a virtual storefront. In some examples, the merchant request may include merchant information such as a merchant name, a merchant location, a merchant offering (i.e., a list of products and/or services), a price list, hours of operation, and/or other suitable merchant information. The system provider device may generate a virtual storefront for the ad hoc merchant based at least partly on the merchant information provided by the merchant request. In some embodiments, the system provider may store any merchant information in a local database (e.g., at the system provider device 108) or in a remote database that is in communication with the system provider, for example, by way of the network 106. Additionally, as described in more detail below, the system provider (e.g., by way of the system provider device 108) may provide the ad hoc merchant virtual storefront to a customer device 104 through the network 106. In some examples, the virtual storefront may be provided to a customer via a mobile application (app) executing on the customer device 104.

In some embodiments, the system provider may include a payment service provider such as, for example, PayPal Inc. of San Jose, Calif., that provides the ad hoc merchant configuration system 100 for the merchant at the merchant location 103, receives a request to establish a virtual storefront, and provides the virtual storefront to a customer device, through the network 106. In some embodiments, as discussed below, the payment service provider process payment requests from the ad hoc merchant, may process payments from the customer to the ad hoc merchant, and may associate the ad hoc merchant location 103 (or its merchant), the customer location 105 (or its customer), merchant devices, customer devices, and/or other components of the system with an ad hoc merchant account in a database located in a non-transitory memory. For example, the payment service provider may use a payment service provider device to transfer funds from a customer payment account (e.g., provided by an account provider through an account provider device, provided by the payment service provider through the payment service provider device, etc.) of the customer to a merchant payment account (e.g., provided by an account provider through an account provider device, provided by the payment service provider through the payment service provider device, etc.) of the merchant to provide payment from the customer to the merchant during a transaction.

Information sent and received through the network 106, merchant devices, and customer devices may be associated with the ad hoc merchant account in the database, and any use of that information may be stored in association with that ad hoc merchant account. Furthermore, the payment service provider may provide the ad hoc merchant configuration system for a plurality of different ad hoc merchants and merchant physical locations, similarly as described for the ad hoc merchant at the merchant location discussed below. Thus, references to a system provider operating a system provider device below may refer to a payment service provider operating a payment service provider device, or may refer to any other entity operating an ad hoc merchant configuration system separate from or in cooperation with a payment service provider.

Figure 2:
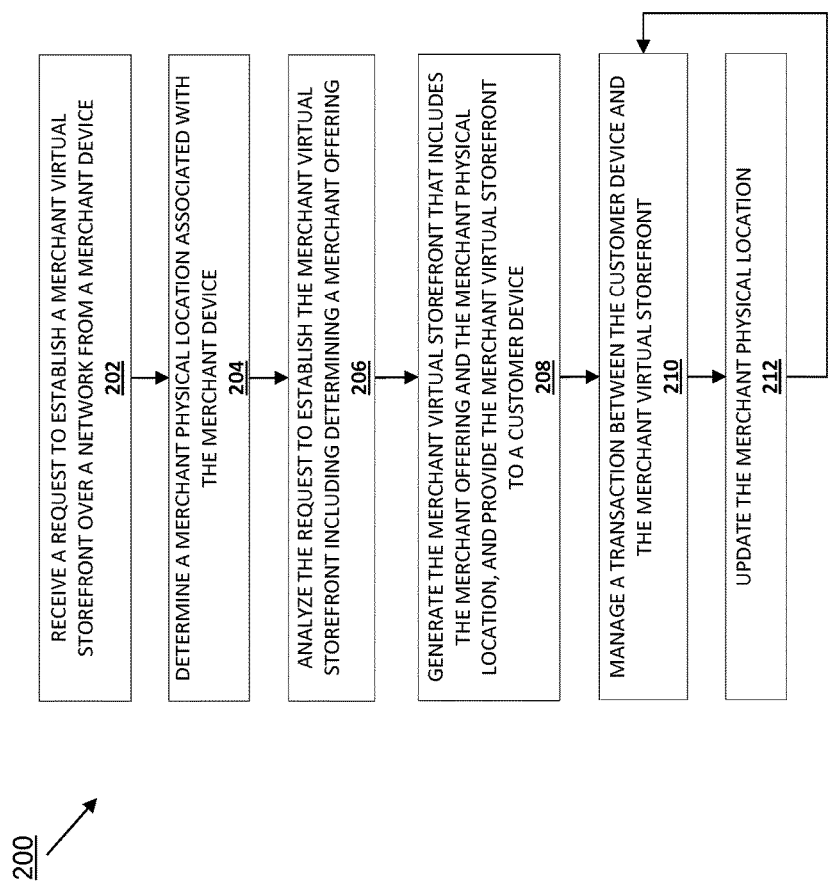
FIG. 2 is a flow chart illustrating an embodiment of a method for providing a merchant virtual storefront to a customer device.

Referring now to FIG. 2, an embodiment of a method 200 for providing a merchant virtual storefront to a customer device is illustrated. One of skill in the art in possession of the present disclosure will recognize that the method 200 may be performed for a plurality of different ad hoc merchants at a variety of physical locations, thereby creating a "pool" of ad hoc merchants represented by a plurality of virtual storefronts created by the communications between the merchants and the system provider and centrally accessible to any number of customers via their customer devices.

Figure 3:
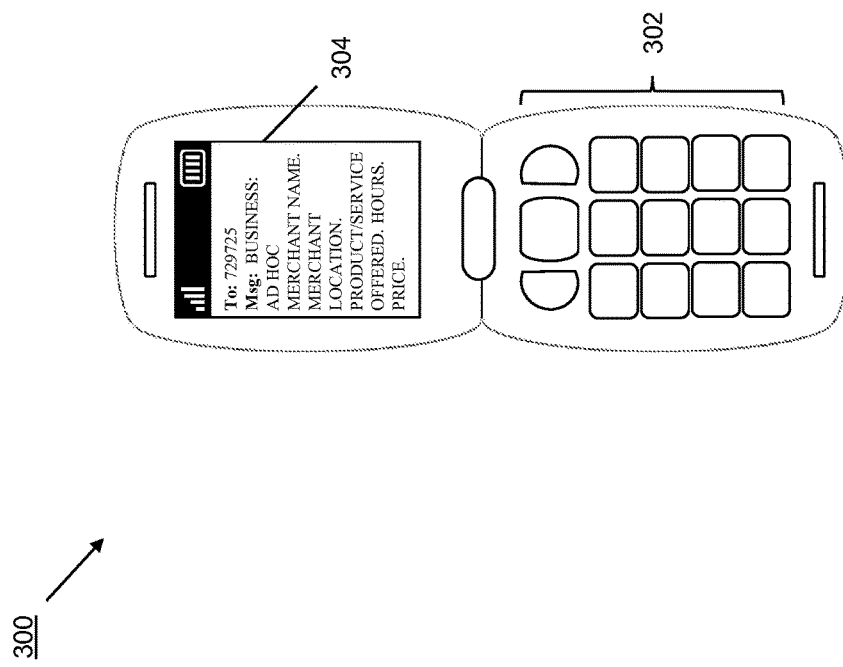
FIG. 3 is a front view illustrating an embodiment of a merchant device displaying a virtual storefront creation request.

The method 200 begins at block 202 where a request to establish a merchant virtual storefront is received from a merchant device. In particular, with reference to FIGS. 1, 2, and 3, a specific example of block 202 of the method 200 is illustrated and described. Referring first to FIG. 3, an example of a merchant device 300 is provided. In the illustrated embodiment, the merchant device 300 includes a cell phone having a keypad 302 and a display 304. In some embodiments an ad hoc merchant, as described above, at an ad hoc merchant location 103 wishes to establish a virtual storefront accessible to potential customers (e.g., via a customer device 104) to indicate the availability of the merchant's products and/or services at the merchant location 103. As such, in some examples, the merchant associated with the merchant device 300 may send an SMS (text) message, including a merchant request to establish a virtual storefront, to a system provider by way of a network (e.g., the network 106). In some embodiments, as illustrated in the display 304 of the merchant device 300 of FIG. 3, the merchant request may include merchant information such as a merchant name, a merchant location, a merchant offering (i.e., a list of products and/or services), a price list, hours of operation, and/or a variety of other merchant information known in the art. While the request at block 202 is illustrated and described as being sent using an SMS message via a "simple" phone (a conventional "flip-phone") to illustrate how the systems and methods of the present disclosure are accessible to merchants with limited technology, in some embodiments, the request at block 202 may be sent using a website or application executing on a "smart" phone or other relatively advanced computing system while remaining within the scope of the present disclosure.

The method 200 then proceeds to block 204 where a physical location of the ad hoc merchant associated with the merchant device 300 is determined. Referring again to the example of FIGS. 1, 2, and 3, a specific example of block 204 of the method 200 is illustrated and described. Considering the example of the request to the system provider to establish a virtual storefront, as illustrated in the display 304 of the merchant device 300, the merchant request may include specific location information (e.g., a specific address or street intersection) as entered by the merchant. In other examples, the merchant may not specifically include location information in the request, but rather the merchant request may include embedded information specific to the merchant device 300 such as embedded location information (e.g., using a GPS-based, triangulation-based, or other location based information determined by a location determination system in the merchant device 300). By way of example, the merchant may not need to specifically input such embedded location information into the request; rather, such embedded information may already be stored in a memory of the merchant device 300 and/or determined on a real-time basis. Thus, the embedded location information can be transmitted as part of, or in conjunction with, the merchant request to the system provider by way of the network 106. Upon determining the physical location of the ad hoc merchant associated with the merchant device 300, for example according to one of the methods described above, the physical location of the ad hoc merchant may be associated with an ad hoc merchant's phone number and/or with an ad hoc merchant account stored in a database accessible to the system provider device 108. In some embodiments, as discussed in more detail below, the system provider device in the ad hoc merchant configuration system 100 may also implement a "location heartbeat" to periodically confirm and/or update the physical location of the ad hoc merchant by periodically retrieving location information from the merchant device 300. By periodically confirming and/or updating the physical location of the ad hoc merchant, the "pool" of ad hoc merchants available to potential customers, via their customer devices, can be properly updated and maintained by the system provider device.

Depending on a type of mobile device used by the merchant, the merchant request includes an SMS (text) message that may be entered and sent by the merchant in any of a number of ways. For example, in the illustration of FIG. 3, the merchant device 300 may include a basic cell phone or basic feature phone (e.g., in contrast to a smartphone), where the merchant may compose a text message for example using multi-tap entry, text-on-nine-keys (T-9) entry, and/or other suitable techniques. While the embodiments herein are shown and described with reference to a merchant device 300 which includes a basic cell phone or basic feature phone, it will be understood that the systems and methods described herein may equally be implemented with a merchant device 300 which includes a smartphone. As used herein, the term "smartphone" refers to a mobile device having one or more of a plurality of features such as a personal digital assistant, a media player, a digital camera, a GPS receiver, a touchscreen user interface, an Internet browser, WiFi connection capability, and/or many other features as known in the art. Thus, in embodiments where the merchant device 300 includes a smartphone, the merchant may compose a text message using alternative techniques such as entry by way of physical keyboard (e.g., integrated with the smartphone), entry by way of an on-screen keyboard (e.g., via the touchscreen user interface), voice-to-text entry, and/or other suitable techniques as known in the art; as well as using an application executing on the merchant device, a website available through a browser provided on the merchant device, and/or via a variety of other smartphone communication techniques known in the art.

The method 200 then proceeds to block 206 where the request to establish the merchant virtual storefront is analyzed by the system provider. In an embodiment of block 206, the system provider device 108 (FIG. 1) analyzes the ad hoc merchant request to establish a virtual storefront for the merchant at the merchant location 103. Analysis of the ad hoc merchant request by the system provider device 108 may include any one of a plurality of operations. In some embodiments, upon receipt of the merchant request, the system provider device 108 (e.g., by way of an ad hoc merchant engine) processes the text of the incoming merchant request. As a specific example, consider a merchant request with a format similar to the request shown in the display 304 of the merchant device 300 (FIG. 3), where the message text ("Msg:" as shown in FIG. 3) of the merchant request is as follows: "Msg: Business: Marco's Tile. Business Ready. Tile Installation. $5 per sq. ft." In some embodiments, the system provider device 108 processes the incoming message and determines, at least, that the name of the ad hoc merchant's business is "Marco's Tile", the service provided is "Tile Installation", the cost of the service is "$5 per sq. ft.", and the ad hoc merchant is "Open for business". Additionally, in some embodiments, the system provider device 108 may determine the ad hoc merchant's cell phone number (e.g., based on the merchant device 300 from which the merchant request was received) and associate that phone number with an ad hoc merchant account stored in a database accessible to the system provider device 108. In particular, in some embodiments, the system provider device 108 may further use the merchant's phone number to search the database for prior ad hoc merchant requests to establish a virtual storefront originating from the same phone number and/or requests originating from the same phone number and using the same business name (e.g., Marco's Tile). In various embodiments, the system provider device 108 may also use the merchant's business name to search for other nearby merchants using the same name. If a naming conflict exists, the system provider device 108 may prompt the merchant (e.g., via a text message to the merchant device 300) to consider changing their business name, for example, in order to avoid customer confusion.

In yet other embodiments, the system provider device 108 may maintain an ad hoc merchant rating system, feedback score, and/or trustworthiness score for the ad hoc merchant. For example, such ad hoc merchant rating systems may be associated with the ad hoc merchant account, and provided to a customer via the customer device 104. In some examples, subsequent requests to establish a virtual storefront for an ad hoc business originating from the same phone number and using the same business name may be used in the ad hoc merchant rating system to improve the rating and/or score of a particular merchant. Also, in other embodiments, the rating and/or score of a particular ad hoc merchant may be improved according to a number of transactions associated with the ad hoc merchant's phone number and/or phone number and business name in combination. For example, payments from a customer to an ad hoc merchant using the ad hoc merchant's phone number and utilizing a payment service provider (e.g., PayPal, Inc. of San Jose, Calif.) may further improve the ad hoc merchant's rating. In other examples, payments by an ad hoc merchant to a brick-and-mortar merchant (e.g., to purchase supplies for the ad hoc business), where the ad hoc merchant utilizes a payment service provider (e.g., PayPal, Inc.) account to which the ad hoc merchant's phone number is associated, may also improve the ad hoc merchant's overall rating. While some examples of improving an ad hoc merchant's rating based on a number of transactions associated with the ad hoc merchant's phone number have been provided, those skilled in the art in possession of the present disclosure will recognize other examples, including other types of transactions, may be used to verify and improve the rating, score, and/or trustworthiness of an ad hoc merchant while remaining within the scope of the present disclosure.

The method 200 then proceeds to block 208 where the merchant virtual storefront is generated by the system provider. Referring to FIGS. 1, 2, 4, and 5, in an embodiment of block 208, the system provider device 108 generates the merchant virtual storefront for the merchant at the merchant location 103 that may be provided to the customer device 104. Specifically, referring to FIG. 4, a customer device 400 is illustrated that includes a display 400a and an input button 400b. While the customer device 400 is illustrated and described as a mobile phone, a variety of other customer devices are envisioned as falling within the scope of the present disclosure. In the illustrated embodiment, the customer device 400 is displaying a merchant search screen 402 that provides the customer associated with the customer device 400 with a listing of local merchants resulting from a search term entered in a search bar 404 of the merchant search screen 402 (e.g., a listing of ad hoc merchants (ad hoc merchants A and B) and brick-and-mortar merchants (merchants C and D) in the illustrated embodiment). In one example, the customer device 400 may include a system provider application and/or a payment service provider application (e.g., a PayPal, Inc. application) which may be launched by the customer and that provides for the functionality of the customer device 400 discussed below. In the illustrated embodiment, the merchant search screen 402 includes a search results section 402a and an information section 402b for providing additional information and/or instructions to the customer. Additionally, in various embodiments, the search results section 402a may further include a merchant name 402c, a merchant rating 402d (e.g., shown as a "star" rating, a numerical rating, and/or other suitable rating), and a merchant distance 402e (e.g., from the customer device 400). While the system provider and/or payment service provider application is illustrated as providing the merchant search screen 402 immediately, in some embodiments, the customer may be required to provide authentication credentials in order to access the merchant search screen 402.

As another specific example, and to provide more detail regarding the merchant virtual storefront, consider a food merchant sending a merchant request where the message text ("Msg:" as shown in FIG. 3) of the merchant request is as follows: "Msg: Business: Angelica's Tacos. Open until 4 pm. Cheese: $1. Chicken, Beef: $2." In some embodiments, the system provider device 108 processes the incoming message and determines, at least, that the name of the ad hoc merchant's business is "Angelica's Tacos", and the context of the menu items listed for sale (e.g., cheese, chicken, and beef tacos). By way of example, the system provider device 108 may use natural language processing and/or machine learning to properly interpret the context and meaning of the merchant request. As discussed above, the merchant may not specifically include location information in the request, but rather the location, specific to the merchant device 300, may be embedded in the merchant request, having been determined for example by GPS-based methods, triangulation-based methods, or other appropriate methods.

In the present example, the system provider device 108 may reply to the merchant request by sending an SMS message (text message) to the merchant to confirm the merchant information and request. Specifically, the system provider device 108 may reply to the merchant with a merchant request confirmation text message such as: "Angelica's Tacos, Open until 4p.m., Located at the intersection of US Hwy. 290 and TX Hwy. 71, Cheese Taco: $1, Chicken Taco: $2, Beef Taco: $2. (Reply "OK" to confirm and post, or "EDIT" to change merchant information)". As previously discussed, the merchant in the present example may not have specifically entered location information; however the system provider may determine the merchant location as described above and provide the location to the merchant in the merchant request confirmation text message.

Additionally, as described above, the system provider device 108 may determine the ad hoc merchant's cell phone number and associate that phone number with an ad hoc merchant account stored in a database accessible to the system provider device 108. The system provider device 108 may also use the ad hoc merchant's name, phone number, and/or location to search the database for prior ad hoc merchant requests to establish a virtual storefront originating from the same phone number, and/or requests originating from the same phone number and using the same business name (e.g., Angelica's Tacos), and/or to search for similarly named businesses located near the ad hoc merchant's location 103. In some examples, if it is the first time an ad hoc merchant has requested establishment of a virtual storefront for an ad hoc business, there may not be a rating and/or score yet associated with that particular merchant. In other examples, as described above, subsequent requests to establish a virtual storefront for the ad hoc business would improve the merchant rating and/or score.

Figure 4:
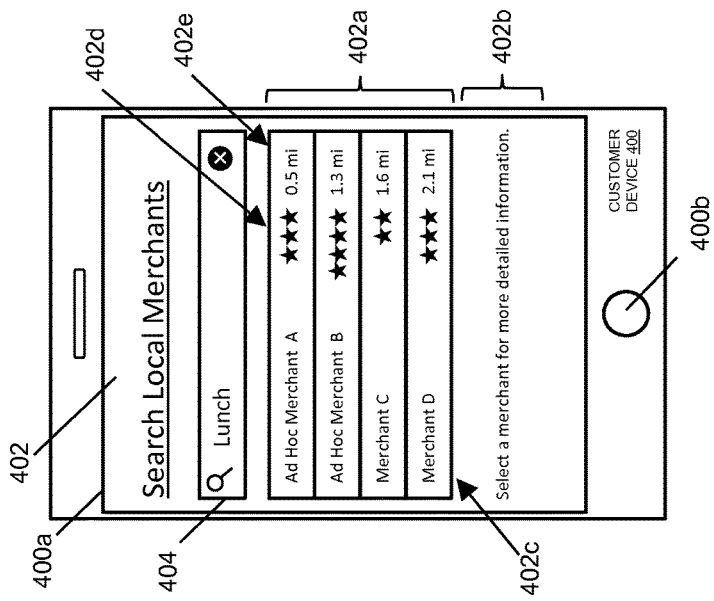
FIG. 4 is a front view illustrating an embodiment of a customer device displaying a list of merchants with virtual storefronts.

Returning to the present example, upon receiving a request to establish a merchant virtual storefront, the system provider may send a confirmation request to the merchant device 300 to confirm the details of the merchant virtual storefront that were determined by the system provider. Upon confirmation by the ad hoc merchant (e.g., Angelica's Tacos) of the merchant request confirmation text message sent by the system provider (e.g., by editing any details, if necessary, and replying "OK" to the system provider), the system provider device 108 creates the ad hoc merchant virtual storefront and makes it accessible via search to customers via the customer device 104. In some embodiments, the system provider may also add and/or embed metadata (e.g., descriptive keywords) related to the ad hoc merchant to assist in providing relevant search results to customers. In the present example (Angelica's Tacos), the system provider may add tag words such as "food", "tacos", "Latin", "lunch", "dinner", "south", and/or other descriptive keywords in association with the ad hoc merchant listing. Referring to FIG. 4, a customer associated with the customer device 400 may launch a system provider application and/or a payment service provider application (e.g., a PayPal, Inc. application) and search for the term "Lunch", as shown in a search bar 404 of the merchant search screen 402. In some embodiments, location 105 of the customer device 400 may be determined by the system provider similarly as described above with reference to determination of the location 103 of the merchant device 300 (e.g., GPS, triangulation, etc.). As a result of the customer's search, a listing of local merchants (e.g., "local" meaning near the present location of the customer device 400) is displayed in the search results section 402a of the merchant search screen 402. In the example of FIG. 4, four merchants are shown in the search results section 402a and include "Ad Hoc Merchant A", "Ad Hoc Merchant B", "Merchant C", and "Merchant D". In some embodiments, Ad Hoc Merchant A and Ad Hoc Merchant B may include merchants which have requested establishment of a virtual storefront, according to embodiments of the present disclosure, and may form a "pool" of ad hoc merchants as described above. Also, in some embodiments, Merchant C and Merchant D may include traditional brick-and-mortar types of merchants. In addition to displaying the merchant names, each of the merchants includes a rating 402d and a distance 402e from the customer location 105, where the customer location 105 is associated with the location of the customer device as shown in FIG. 1. While a specific example of search results for local merchants has been shown and described, one of skill in the art in possession of the present disclosure will recognize that a wide variety of search results, search parameters, search filters, and/or other search functions may be implemented within the a systems and methods discussed herein, and thus will fall within the scope of the present disclosure.

Figure 5:
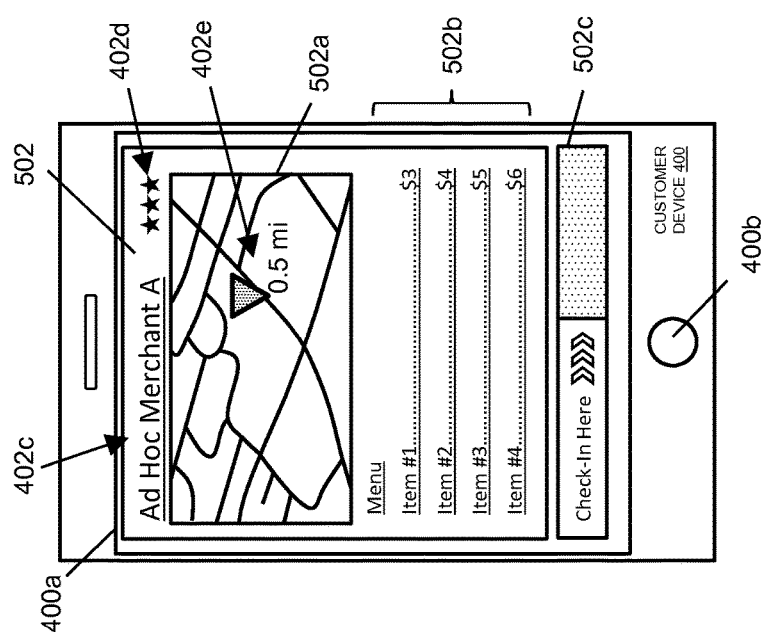
FIG. 5 is a front view illustrating an embodiment of a customer device displaying a virtual storefront for an ad hoc merchant.

Continuing with the present example, and with reference to FIGS. 4 and 5, the customer using the customer device 400 may be interested in seeing more information about Ad Hoc Merchant A, and in response may select Ad Hoc Merchant A (e.g., by way of a touchscreen user interface of the customer device 400). As a result of selecting Ad Hoc Merchant A, the customer device 400 displays an ad hoc merchant virtual storefront 502 associated with Ad Hoc Merchant A, as shown in FIG. 5, that provides the customer associated with the customer device 400 with a more detailed set of information related to Ad Hoc Merchant A. For example, the ad hoc merchant virtual storefront 502 may include the merchant name 402c, the merchant rating 402d, the merchant distance 402e and location as shown on a map

502a, a list of merchant offerings 502b (e.g., a menu), and a check-in slider 502c that allows customers in proximity to a merchant location to "check-in" to the merchant location, as discussed below.

Figure 6:
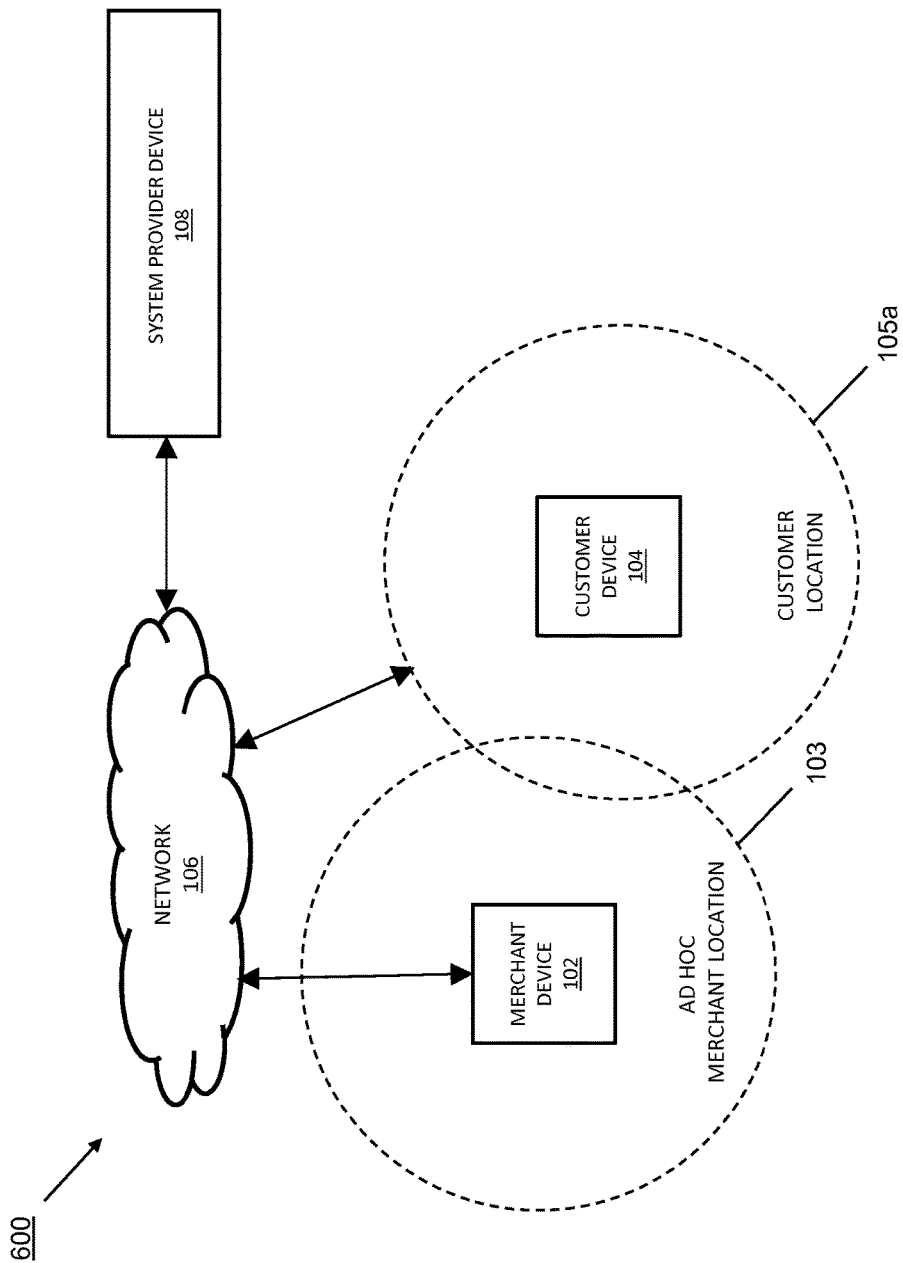
FIG. 6 is a schematic view illustrating an embodiment of an ad hoc merchant configuration system including a customer device in proximity to a merchant device.
Figure 7:
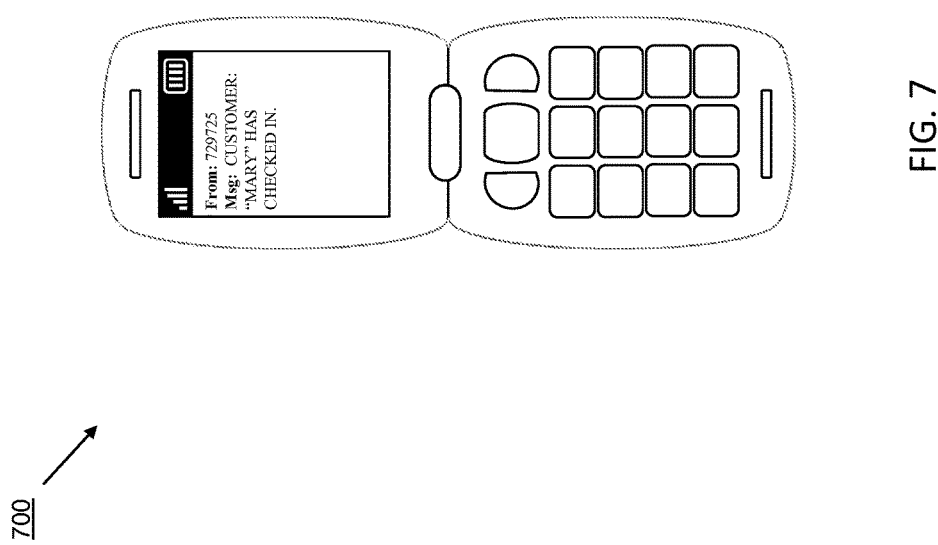
Figure 8:
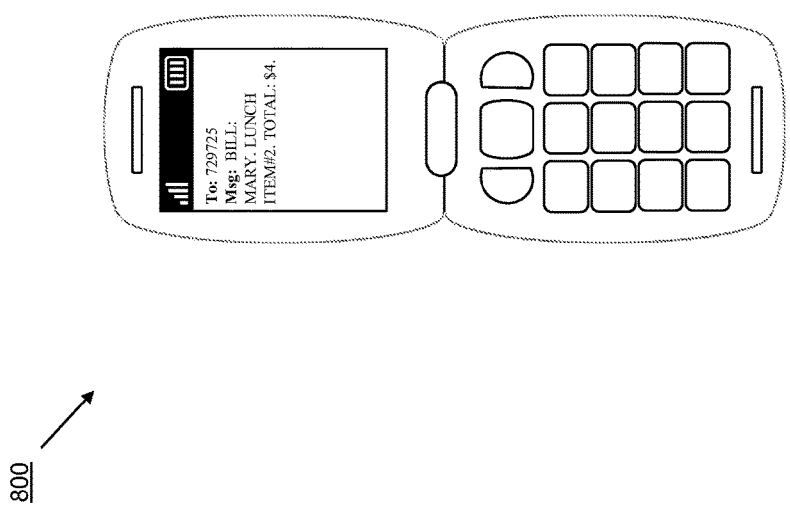
FIG. 8 is a front view illustrating an embodiment of a merchant device displaying a payment request.
Figure 9:
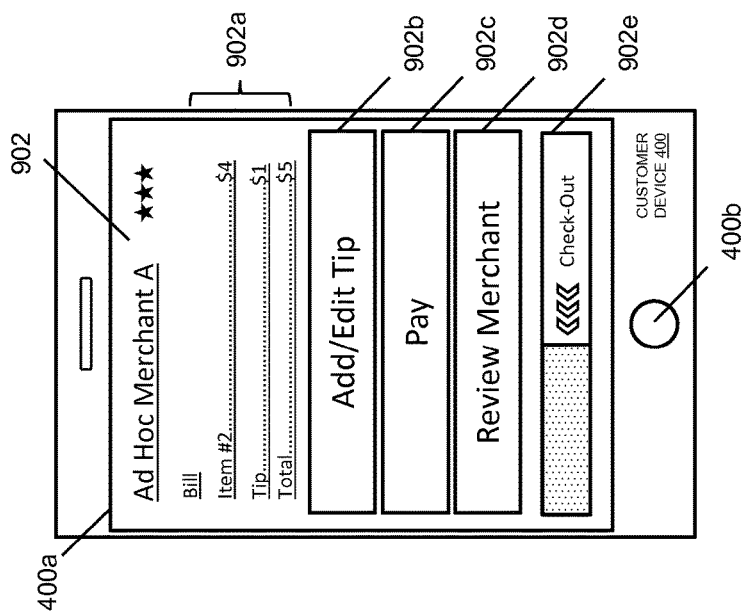
FIG. 9 is a front view illustrating an embodiment of a customer device displaying a virtual storefront for an ad hoc merchant including a payment screen.

The method 200 then proceeds to block 210 where the system provider manages a transaction between the customer device and the merchant virtual storefront. In an embodiment of block 210, continuing with the above example and with reference to FIGS. 5-9, consider that the customer that was interested in Ad Hoc Merchant A proceeds to the ad hoc merchant location 103, for example according to directions provided by the map 502a. In some embodiments, as shown in FIG. 6, when a customer location 105a is in proximity to the ad hoc merchant location 103, then the customer may be allowed to "check-in" to the ad hoc merchant location 103. In some examples, the customer may check-in to the merchant location 103 by sliding the check-in slider 502c from left to right across the touchscreen user interface of the customer device 400. In embodiments of the present disclosure, a customer may "check-in" in order to pay for goods and/or services, for example utilizing a payment service provider (e.g., PayPal, Inc.). In another embodiment, and with reference to FIGS. 6 and 7, when a customer at location 105a checks-in to an ad hoc merchant location 103, the system provider device 108 may notify the ad hoc merchant. As illustrated in FIG. 7, the system provider device 108 may send an SMS message (text message) to the merchant device 102 to notify the merchant that a customer has checked-in. For example, the system provider device 108 in FIG. 7 has sent a text message such as: "Customer: 'Mary' has checked in." In some embodiments, for example when the merchant device 102 includes a smartphone, the check-in notification received by the merchant device 102, from the system provider device 108, may include a photograph and/or other customer-identifying information. In some embodiments, after a customer has checked-in, the merchant may issue a bill to the customer for goods provided and/or services rendered. For example, with reference to FIG. 8, the merchant may send a bill to the customer (via the system provider device 108) by sending a text message such as: "Msg: Bill: Mary. Lunch Item #2. Total: $4." In some embodiments, the system provider device 108 may process the incoming message and determine, for example by using natural language processing and/or machine learning, that customer "Mary" should be billed $4 for Lunch Item #2.

Continuing with the above example, the customer, who has previously checked-in to the ad hoc merchant location 103, receives an electronic bill (e.g., from the payment service provider). With reference to the example of FIG. 9, the customer device 400 is displaying a payment screen 902 associated with the ad hoc merchant virtual storefront 502 (FIG. 5) for the ad hoc merchant location 103. As shown, the payment screen 902 provides the customer associated with the customer device 400 with an itemized bill of the goods and/or services purchased from Ad Hoc Merchant A. For example, the payment screen 902 may include an itemized bill section 902a, an add/edit tip button 902b, a pay button 902c, a review merchant button 902d, and a check-out slider 902e that allows customers to check-out from a merchant location. In some embodiments, any of the add/edit tip button 902b, the pay button 902c, and/or the review merchant button 902d may include a touchscreen interface button. In some embodiments, the customer may check-out to the merchant location 103 by sliding the check-out slider 902e from right to left across the touchscreen user interface of the customer device 400. In some examples, the check-in slider 502c and the check-out slider 902e are substantially the same slider configured in one of two positions (e.g., a "checked-in position" or a "checked-out position"). In some embodiments, when a customer location 105a is no longer in proximity to the merchant location (e.g., customer location 105 of FIG. 1), then the customer may be automatically checked-out of the merchant location 103. In various embodiments, the customer may add and/or edit a tip, in addition to the payment associated with the billed items, by way of the add/edit tip button 902b. Illustratively, the customer may use the pay button 902c to confirm payment (e.g., via the payment service provider) to the ad hoc merchant. In some embodiments, the customer may leave a review and/or feedback for the merchant using the review merchant button 902d. As discussed above, such customer reviews may be aggregated and be made available to potential customers via the merchant virtual storefront. In addition to customer reviews, in other embodiments, the rating and/or score of Ad Hoc Merchant A may be improved upon completion of the customer transaction, as a number of transactions associated with the ad hoc merchant's phone number increases, and/or in any of the variety of manners discussed above.

After confirmation of payment by the customer, in some embodiments, the merchant may receive another text message from the system provider device 108 confirming successful completion of the transaction. In some examples, the payment service provider or system provider may also itemize the goods and/or services sold throughout the existence of a particular ad hoc merchant, for example, to help the ad hoc merchant keep track of inventory and sales, and the payment service provider may send such metrics to the ad hoc merchant (e.g., via text message, an application executing on the merchant device, etc.). In one example, the payment service provider may provide such sales metrics by analyzing the purchasing messages sent to the ad hoc merchant and its customers (e.g., via the system provider device 108) to understand an amount of goods and/or services sold. In addition, such inventory information may be provided to customers to, for example, to inform those customers whether inventory is low for particular items (e.g., "Angelica's Taco's is running low on chicken tacos—only 5 left!").

In various embodiments, the system provider will store the ad hoc merchant information (e.g., name, phone number, location, and/or other information), as well as transaction history, ratings, feedback, and trustworthiness score in association with the ad hoc merchant account in a database that is accessible to the system provider device 108. In some embodiments, upon a subsequent request by the merchant to the system provider device 108 to establish a virtual storefront, the system provider may recognize if the ad hoc merchant has previously requested to establish the same business (e.g., by comparison of phone numbers and/or business names stored in merchant accounts in the database accessible to the system provider device 108). In some embodiments, the system provider may recall such previous requests to establish a virtual storefront and also "remember" (i.e., recall from a system provider memory) previous attributes of the ad hoc merchant business such as business name, hours of operation, merchant offerings, merchant location, and/or other merchant information. This information may be stored as an ad hoc merchant "business template". In some embodiments, the ad hoc merchant may provide the merchant business template in response to subsequent requests to establish the virtual storefront (e.g., "You previously sold 3 types of tacos (chicken, beef, and cheese) and were open until 4 pm"), and/or the merchant may readily alter the business template, for example, by sending a message to the system provider including any updated information (e.g., "update the price of beef tacos to $3 each").

Figure 10:
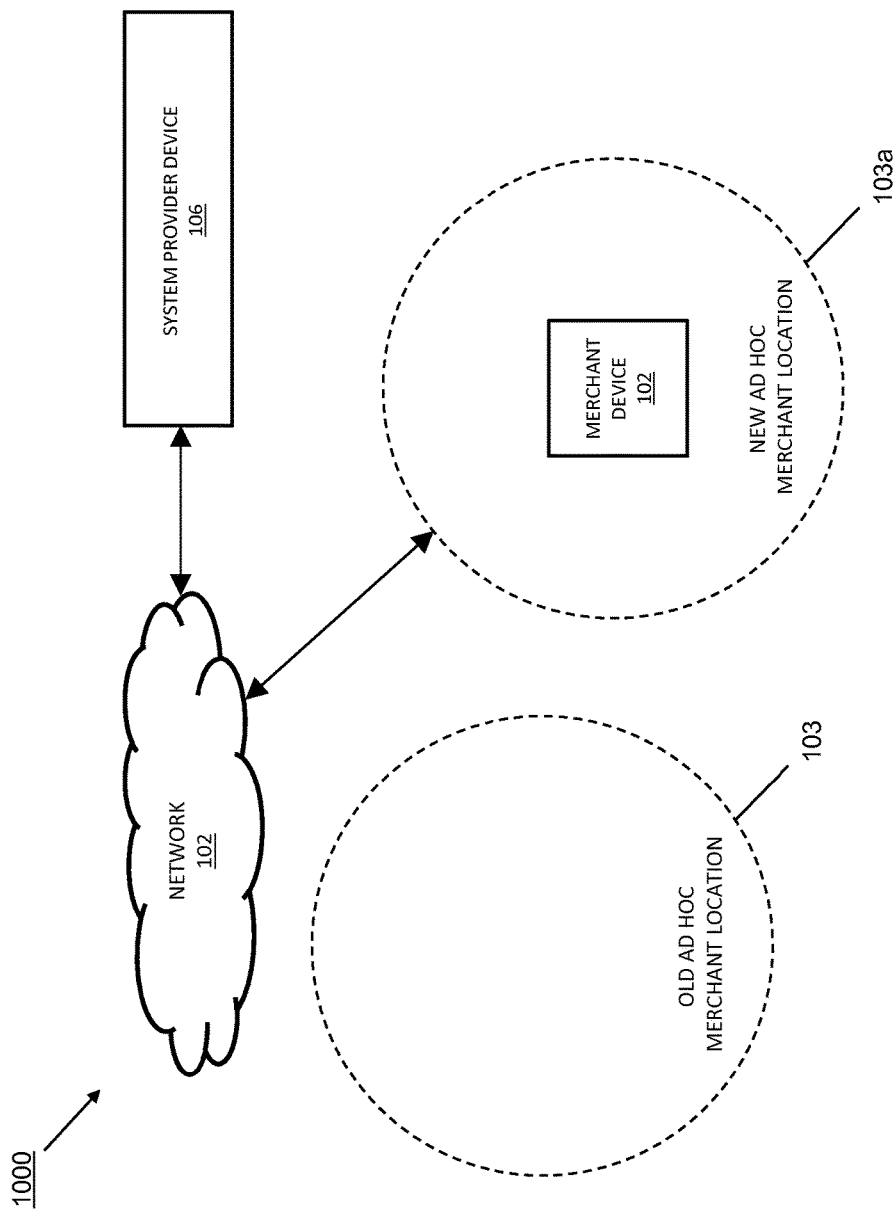
FIG. 10 is a schematic view illustrating an embodiment of an ad hoc merchant configuration system where a merchant device has moved to another location.
Figure 11:
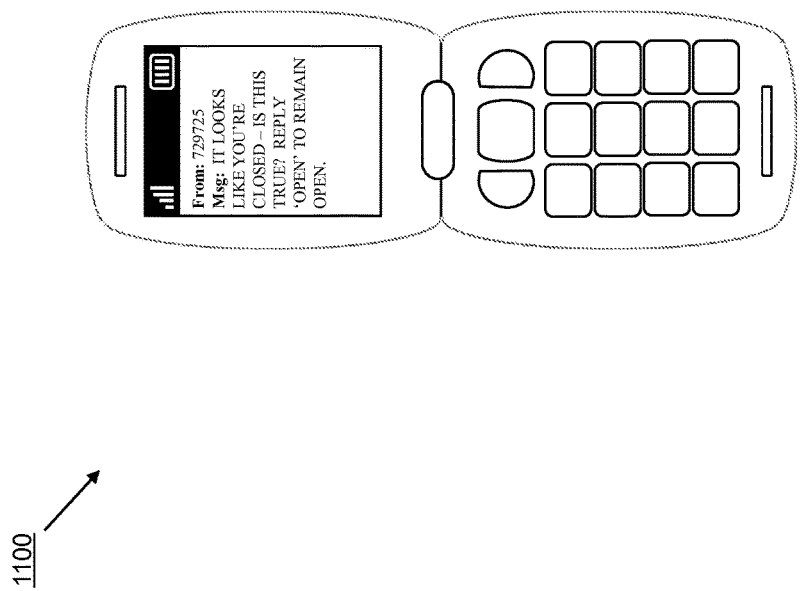
FIG. 11 is a front view illustrating an embodiment of a merchant device displaying a location heartbeat.

In various examples, the ad hoc merchant located at ad hoc merchant location 103 may move to a new location, for example, as part of normal business operations, in order to find a more heavily trafficked location, in order to look for new customers, to take a break, to close the business for the day, and/or for any number of other reasons known in the art. Thus, it is beneficial for the systems and methods of the present disclosure to periodically update the location and status (i.e., open/closed) of the ad hoc merchant. As such, the method 200 then proceeds to block 212 where the system provider updates the merchant physical location. In an embodiment of block 212, the ad hoc merchant configuration system 100 may implement a "location heartbeat" to periodically retrieve, confirm and/or otherwise update the physical location of the ad hoc merchant. By periodically retrieving, confirming, and/or updating the physical location of ad hoc merchants, the "pool" of ad hoc merchants available to potential customers, via their customer devices, can be properly updated and maintained by the system provider device. For example, with reference to FIGS. 10 and 11, if an ad hoc merchant that was previously located at the merchant location 103, moves to a new merchant location 103a, the system provider device 108 may send a text message to the merchant device 102. In some embodiments, the new merchant location 103a may be significantly different than merchant location 103. For example, the new merchant location 103a may be in a different zip code or several miles away, while in other examples, the new merchant location 103a may also be just a few blocks away or even across a street. In the example of FIG. 11, the system provider device 108 may text the merchant a status request update message such as: "Msg: It looks like you're closed—is this true? Reply 'OPEN' to remain Open." In some embodiments, if the merchant wishes to stay open, the merchant may reply 'OPEN' and the ad hoc virtual storefront will remain active, albeit with an updated ad hoc merchant location 103a. In other embodiments, if the merchant does not reply to such "location heartbeat" messages within a specified time (e.g., 15 or 30 minutes), then the ad hoc merchant virtual storefront may be removed from the pool of merchant virtual storefronts and/or the business may be indicated as being closed. In various embodiments, such location heartbeat requests from the system provider may be triggered by significant changes in the ad hoc merchant location, as described above, or they may be sent out to ad hoc merchants on specific time intervals, for example, every 30 minutes, every hour, or other customizable time interval. In other embodiments, the ad hoc merchant may also send specific requests to the system provider (e.g., via text message) to close/deactivate/remove their ad hoc merchant virtual storefront.

Thus, systems and methods have been described that provide for the generation of merchant virtual storefronts for ad hoc merchants and the provision of those merchant virtual storefronts to customers. The generation and provision of merchant virtual storefronts provides ad hoc merchants with the ability to quickly and easily market and advertise their business with even very limited technology in manners that have been previously unavailable to them, and provides customers with more merchants to choose from in whatever location they are currently in. In addition to generating and providing the merchant virtual storefronts, the system provider device may operate, alone or with others, to provide payments services, inventory tracking, sales tracking, and/or a variety of other services to the merchant and/or customer that further benefit the merchant's business and provide further conveniences for the customer.

While a specific example of a food merchant has been provided above, other types of merchants will benefit greatly from the systems and methods of the present disclosure as well. For example, a sub-contractor such as a tile installer may use the systems and methods discussed above to have the details of their tile installation business provided to customers looking for tile installation, and have their current location and/or contact information provided to customer such that those customers may hire them for their services. The system provider device may operate to analyze searches by customers to determine whether an ad hoc merchant is appropriate. For example, a customer that searches for "bathroom remodel" may be provided the ad hoc merchant details for the tile installation business discussed above. In addition, if the customer provides details about the job to-be performed (e.g., a bathroom square footage), the system provider device may provide the customer the potential cost of hiring that ad hoc merchant. Furthermore, if the system provider determines that the customer has hired the ad hoc merchant, (e.g., via a transaction begun between the merchant and customer, a message from the merchant and/or customer, etc.), the system provider device may update the status of that ad hoc merchant as "busy" or otherwise unavailable for other customers.

Figure 12:
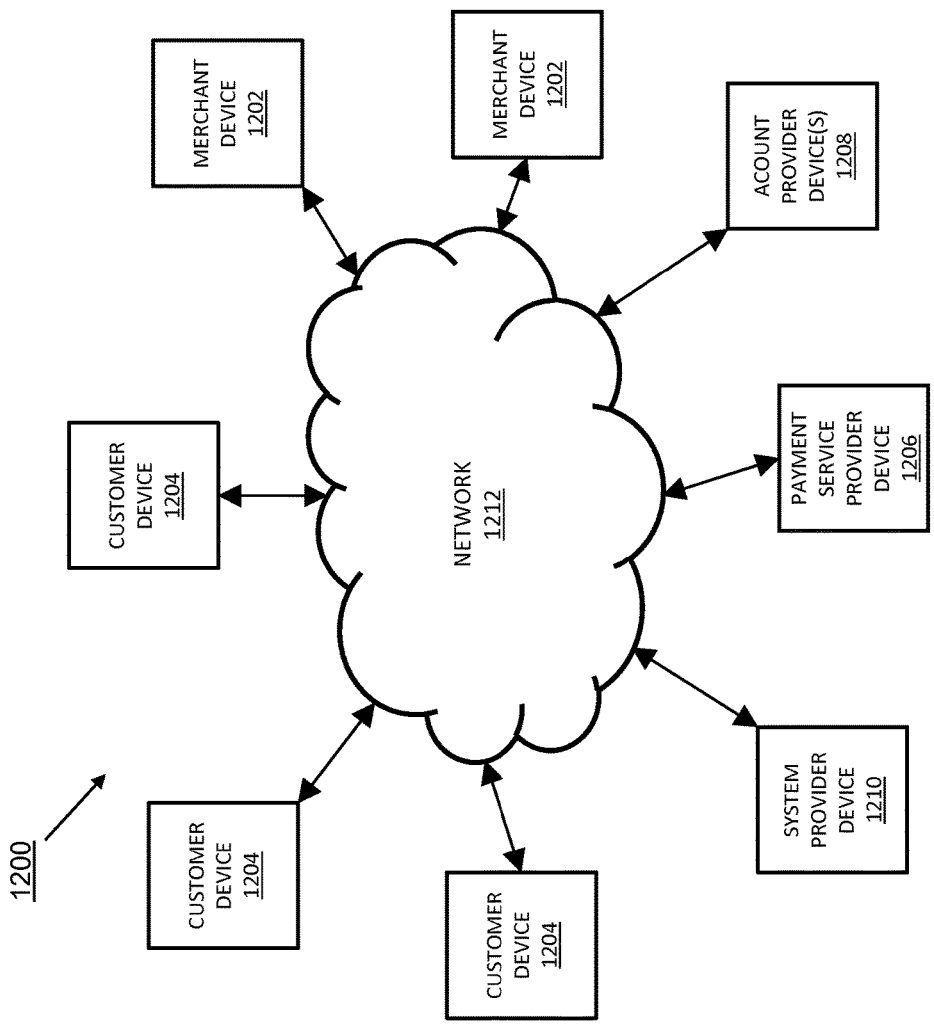
FIG. 12 is a schematic view illustrating an embodiment of a networked system.

Referring now to FIG. 12, an embodiment of a network-based system 1200 for implementing one or more processes described herein is illustrated. As shown, the network-based system 1200 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 12 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1200 illustrated in FIG. 12 includes a plurality of customer devices 1204, a plurality of merchant devices 1202, a payment service provider device 1206, account provider device(s) 1208, and/or a system provider device 1210 in communication over one or more networks 1212. The customer devices 1204 may be the customer devices discussed above and may be operated by the customers discussed above. The merchant devices 1202 may be the merchant devices discussed above and may be operated by the merchants discussed above. The payment service provider device 1206 may be the payment service provider devices discussed above and may be operated by a payment service provider such as, for example, PayPal Inc. of San Jose, Calif. The system provider devices 1210 may be the system provider devices discussed above and may be operated by the system providers discussed above. The account provider devices 1208 may be operated by credit card account providers, bank account providers, savings account providers, and a variety of other account providers known in the art.

The customer devices 1204, merchant devices 1202, account provider devices 1208, payment service provider device 1206, and/or system provider device 1210 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1200, and/or accessible over the network 1212.

The network 1212 may be implemented as a single network or a combination of multiple networks. For example, in various embodiments, the network 1212 may include the Internet and/or one or more intranets, landline networks, wireless networks, and/or other appropriate types of networks.

The customer devices 1204 may be implemented using any appropriate combination of hardware and/or software configured for wired and/or wireless communication over network 1212. For example, in one embodiment, the customer devices 1204 may be implemented as a personal computer of a user in communication with the Internet. In other embodiments, the customer devices 1204 may be a smart phone, personal digital assistant (PDA), laptop computer, and/or other types of computing devices.

The customer devices 1204 may include one or more browser applications which may be used, for example, to provide a convenient interface to permit the customer to browse information available over the network 1212. For example, in one embodiment, the browser application may be implemented as a web browser configured to view information available over the Internet.

The customer devices 1204 may also include one or more toolbar applications which may be used, for example, to provide user-side processing for performing desired tasks in response to operations selected by the customer. In one embodiment, the toolbar application may display a user interface in connection with the browser application.

The customer devices 1204 may further include other applications as may be desired in particular embodiments to provide desired features to the customer devices 1204. In particular, the other applications may include a payment application for payments assisted by a payment service provider through the payment service provider device 1206. The other applications may also include security applications for implementing user-side security features, programmatic user applications for interfacing with appropriate application programming interfaces (APIs) over the network 1212, or other types of applications. Email and/or text applications may also be included, which allow customer payer to send and receive emails and/or text messages through the network 1212. The customer devices 1204 includes one or more customer and/or device identifiers which may be implemented, for example, as operating system registry entries, cookies associated with the browser application, identifiers associated with hardware of the customer devices 1204, or other appropriate identifiers, such as a phone number. In one embodiment, the customer identifier may be used by the payment service provider device 1206 and/or account provider device 1208 to associate the user with a particular account as further described herein.

The merchant devices 1202 may be maintained, for example, by ad hoc merchants offering various products and/or services in exchange for payment to be received conventionally or over the network 1212. In this regard, the merchant devices 1202 may include a database identifying available products and/or services (e.g., collectively referred to as items) which may be made available for viewing and purchase by the customer.

The merchant device 1202 may also provide a checkout application which may be configured to facilitate the purchase by the payer of items. The checkout application may be configured to accept payment information from the customer through the customer devices 1204, the account provider through the account provider device 1208, and/or from the payment service provider through the payment service provider device 1206 over the network 1212.

Figure 13:
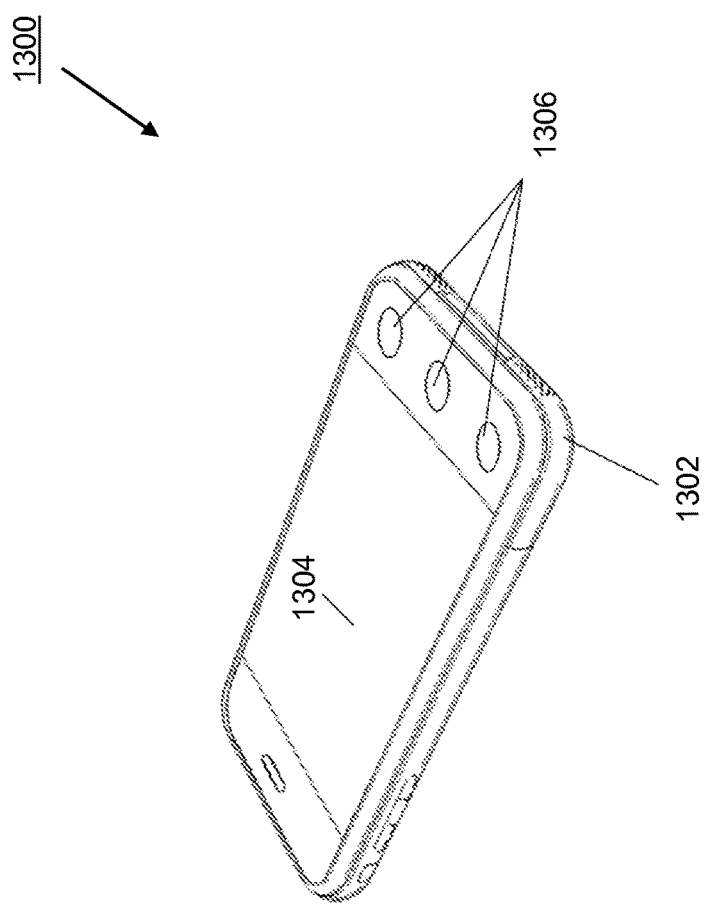
FIG. 13 is a perspective view illustrating an embodiment of a customer device.

Referring now to FIG. 13, an embodiment of a customer device 1300 is illustrated. The customer device 1300 may be the customer devices 104 or 400 discussed above. The customer device 1300 includes a chassis 1302 having a display 1304 and an input device including the display 1304 and a plurality of input buttons 1306. One of skill in the art will recognize that the customer device 1300 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 14:
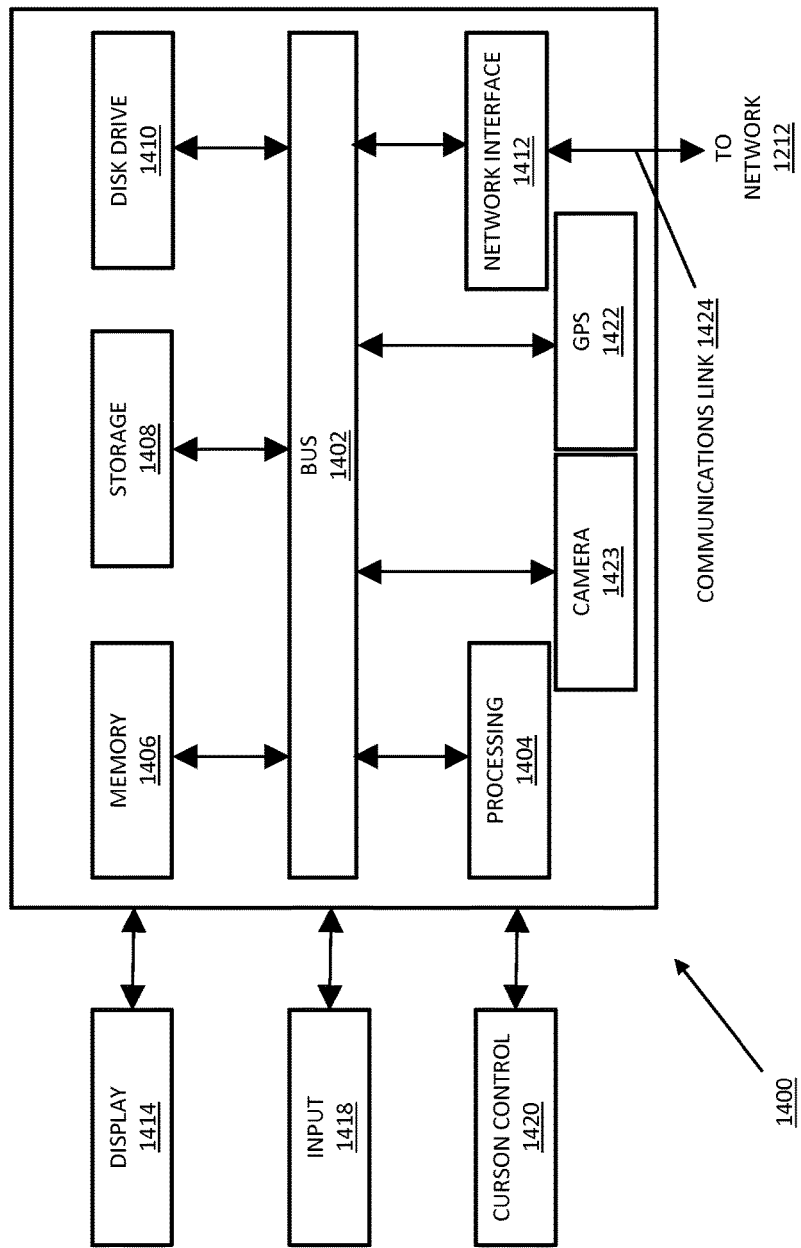
FIG. 14 is a schematic view illustrating an embodiment of a computer system.

Referring now to FIG. 14, an embodiment of a computer system 1400 suitable for implementing, for example, the customer devices 104 or 400, merchant devices 102 or 1202, payment service provider device 1206, account provider device(s) 1208, and/or system provider devices 108 or 1210, is illustrated. It should be appreciated that other devices utilized by customers, merchants, account provider devices, payment service providers, and/or system providers in the system discussed above may be implemented as the computer system 1400 in a manner as follows.

In accordance with various embodiments of the present disclosure, computer system 1400, such as a computer and/or a network server, includes a bus 1402 or other communication mechanism for communicating information, which interconnects subsystems and components, such as a processing component 1404 (e.g., processor, micro-controller, digital signal processor (DSP), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), a location determination component 1422 (e.g., a Global Positioning System (GPS) device as illustrated, a cell tower triangulation device, and/or a variety of other location determination devices known in the art), and/or a camera component 1423. In one implementation, the disk drive component 1410 may comprise a database having one or more disk drive components.

In accordance with embodiments of the present disclosure, the computer system 1400 performs specific operations by the processor 1404 executing one or more sequences of instructions contained in the memory component 1406, such as described herein with respect to the customer devices 104 or 400, merchant devices 102 or 1202, payment service provider device 1206, account provider device(s) 1208, and/or system provider devices 108 or 1210. Such instructions may be read into the system memory component 1406 from another computer readable medium, such as the static storage component 1408 or the disk drive component 1410. In other embodiments, hard-wired circuitry may be used in place of or in combination with software instructions to implement the present disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1400. In various other embodiments of the present disclosure, a plurality of the computer systems 1400 coupled by a communication link 1424 to the network 1212 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1400 may transmit and receive messages, data, information and instructions, including one or more programs (i.e., application code) through the communication link 1424 and the network interface component 1412. The network interface component 1412 may include an antenna, either separate or integrated, to enable transmission and reception via the communication link 1424. Received program code may be executed by processor 1404 as received and/or stored in disk drive component 1410 or some other non-volatile storage component for execution.

Figure 15:
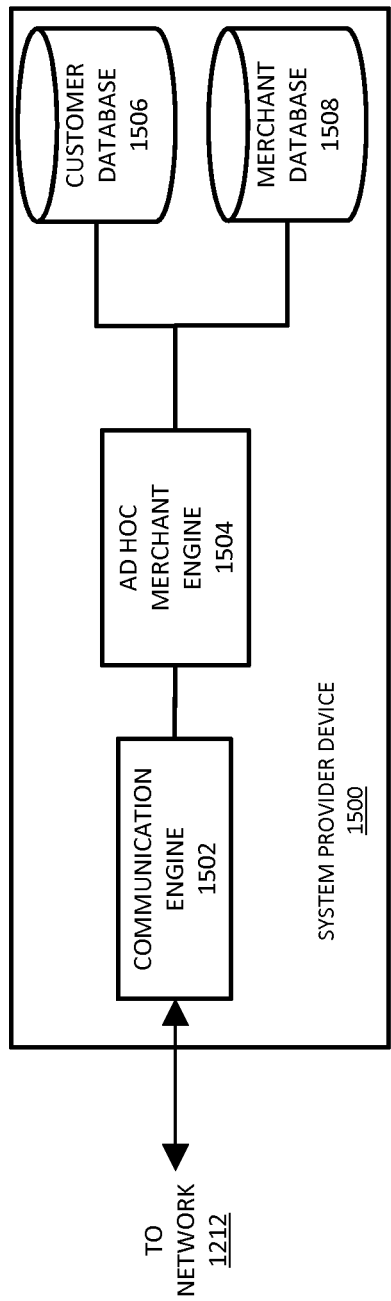
FIG. 15 is a schematic view illustrating an embodiment of a system provider device.

Referring now to FIG. 15, an embodiment of a system provider device 1500 is illustrated. In an embodiment, the device 1500 may be the system provider device 108 discussed above. The device 1500 includes a communication engine 1502 that is coupled to the network 1212 and to an ad hoc merchant engine 1504 that is coupled to a customer information database 1506 and a merchant information database 1508. The communication engine 1502 may be software or instructions stored on a computer-readable medium that allows the device 1500 to send and receive information over the network 1212. The an ad hoc merchant engine 1504 may be software or instructions stored on a computer-readable medium that is operable to receive and analyze requests to establish a merchant virtual storefront from an ad hoc merchant, determine an ad hoc merchant physical location, determine an ad hoc merchant's offering, establish the merchant virtual storefront, provide the ad hoc merchant virtual storefront to a customer device, as well as provide any of the other functionality that is discussed above. While the databases 1506 and 1508 have been illustrated as located in the device 1500, one of skill in the art will recognize that they may be connected to the an ad hoc merchant engine 1504 through the network 1212 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   at least one processing unit; and
   a non-transitory memory storing instructions that, when executed by the at least one processing unit, perform a method, comprising:
   receiving an electronic text-based message from a merchant device;
   determining a physical location of the merchant based, at least in part, on information associated with the merchant device;
   analyzing the electronic text-based message by a natural language processing system to determine whether the electronic message includes a request to establish a merchant virtual storefront;
   when it is determined that the electronic text-based message includes the request:

automatically determine one or more products or services the merchant is offering based, at least in part, on information included in the electronic text-based message;
sending a confirmation electronic message to the merchant device to confirm the request; and
automatically generate the merchant virtual storefront, wherein the merchant virtual storefront includes information about the one or more products or services the merchant offering and information about the determined merchant physical location; and
providing the merchant virtual storefront to a customer device in response to receiving a request from the customer device.

2. The system of claim 1, further comprising instructions for:
receiving a plurality of requests to establish a plurality of merchant virtual storefronts from a plurality of merchant devices;
creating an ad hoc labor pool that includes a plurality of merchant virtual storefronts, wherein each of the plurality of merchant virtual storefronts include at least one respective merchant offering and a respective merchant physical location; and
providing at least a subset of the ad hoc labor pool to the customer device.

3. The system of claim 1, further comprising instructions for:
periodically sending a status request update message to the merchant device; and
automatically updating the merchant physical location associated with the merchant device based on a response or non-response to the status request update message.

4. The system of claim 1, further comprising instructions for:
detecting that the merchant device is located at an alternate physical location; and
updating the merchant physical location associated with the merchant device.

5. The system of claim 1, further comprising instructions for:
associating a merchant device identifier with a merchant account in a database within the non-transitory memory; and
searching the database for prior requests from the merchant device identifier to establish the merchant virtual storefront.

6. The system of claim 5, further comprising instructions for modifying a rating of a merchant associated with the merchant device.

7. The system of claim 5, further comprising instructions for:
processing a transaction at a payment service provider, wherein the transaction is associated with the merchant device identifier; and
modifying a rating of a merchant associated with the merchant device.

8. A method, comprising:
receiving, by a system provider device over a communication network, an electronic text-based message from a merchant device;
determining, by the system provider device, a physical location associated with the merchant device;
analyzing, by the system provider device, the electronic text-based message via a natural language processing system to determine whether the electronic text-based message includes a request to establish a merchant virtual storefront;
when it is that the electronic text-based message includes the request:
analyzing, by the system provider device, the electronic text-based message to automatically determine a merchant offering;
sending, by the system provider device, a confirmation electronic message to the merchant device confirming the request; and
automatically generate, by the system provider device, the merchant virtual storefront that includes the merchant offering and information about the merchant physical location; and
providing the merchant virtual storefront to a customer device in response to receiving a request from the customer device.

9. The method of claim 8, further comprising:
receiving, by the system provider device, a plurality of requests to establish a plurality of merchant virtual storefronts from a plurality of merchant devices;
creating, by the system provider device, an ad hoc labor pool that includes a plurality of merchant virtual storefronts, wherein each of the plurality of merchant virtual storefronts include a respective merchant offering and a respective merchant physical location; and
providing, by the system provider device, a subset of the ad hoc labor pool to the customer device.

10. The method of claim 8, further comprising:
periodically sending, by the system provider device, a status request update message to the merchant device; and
updating, by the system provider device, the merchant physical location associated with the merchant device based on a response or non-response to the status request update message.

11. The method of claim 8, further comprising:
detecting, by the system provider device, that the merchant device is located at an alternate physical location; and
updating, by the system provider device, the merchant physical location associated with the merchant device.

12. The method of claim 8, further comprising:
associating, by the system provider device, a merchant device identifier with a merchant account stored in a database; and
searching, by the system provider device, the database for prior requests from the merchant device identifier to establish the merchant virtual storefront.

13. The method of claim 12, further comprising modifying, by the system provider device, a rating of a merchant associated with the merchant device in response to find a prior request from the merchant device to establish the merchant virtual storefront.

14. The method of claim 12, further comprising:
processing, by the system provider device, a transaction at a payment service provider, wherein the transaction is associated with the merchant device identifier; and
modifying, by the system provider device, a rating of a merchant associated with the merchant device.

15. The method of claim 12, further comprising:
associating, by the system provider device, a merchant name with the merchant account stored in the database;

detecting, by the system provider device, a naming conflict between the merchant name and another merchant name that is associated with another merchant account in the database; and sending, by the system provider device, a name change message to the merchant device.

16. The method of claim 12, further comprising:

checking-in, by the system provider device, a customer located at the merchant physical location;

processing, by the system provider device, a customer transaction, wherein the customer transaction is associated with the merchant device identifier; and checking-out, by the system provider device, the customer located at the merchant physical location.

17. A non-transitory machine-readable storage medium comprising a plurality of machine-readable instructions that, when executed by one or more processors, are adapted to cause the one or more processors to perform a method, comprising:

receiving an electronic text-based message from a merchant device;

determining a current merchant physical location associated with the merchant device;

analyzing the electronic text-based message by a natural language processing system to determine whether the electronic message includes a request to establish a merchant virtual storefront;

when it is determined that the electronic message includes the request:

analyzing the text-based electronic message to automatically determine a merchant offering;

sending a confirmation electronic message to the merchant device confirming the request; and automatically generate a merchant virtual storefront that includes the merchant offering and information about the merchant physical location; and providing the merchant virtual storefront to be displayed on a customer device.

18. The non-transitory machine-readable medium of claim 17, further comprising instructions for:

periodically sending a status request update message to the merchant device; an updating the merchant physical location associated with the merchant device based on a response or non-response to the status updated message.

19. The non-transitory machine-readable medium of claim 18, further comprising instructions for:

associating a merchant device identifier with a merchant account in a database; and searching the database for prior requests from the merchant device identifier to establish the merchant virtual storefront.

20. The non-transitory machine-readable medium of claim 18, further comprising instructions for:

processing a transaction, wherein the transaction is associated with the merchant device identifier; and modifying a rating of a merchant associated with the merchant device.

* * * * *

UNITED STATES PATENT AND TRADEMARK OFFICE
CERTIFICATE OF CORRECTION

PATENT NO. : 10,121,174 B2
APPLICATION NO. : 14/265094
DATED : November 6, 2018
INVENTOR(S) : Kamal Zamer It is certified that error appears in the above-identified patent and that said Letters Patent is hereby corrected as shown below:

In the Claims

In Column 20, Line 4, in Claim 8, delete "is" and insert -- is determined --, therefor.
In Column 22, Line 13, in Claim 18, delete "an" and insert -- and --, therefor.

Signed and Sealed this
Eleventh Day of June, 2019

Andrei Iancu
*Director of the United States Patent and Trademark Office*